United States Patent [19]

Schiel

[11] Patent Number: 5,033,176
[45] Date of Patent: Jul. 23, 1991

[54] SAG COMPENSATING ROLL FOR ROLL PRESSES

[75] Inventor: Christian Schiel, Heidenheim, Fed. Rep. of Germany

[73] Assignee: J. M. Voith GmbH

[21] Appl. No.: 555,257

[22] Filed: Jul. 18, 1990

[30] Foreign Application Priority Data

Jul. 28, 1989 [DE] Fed. Rep. of Germany ....... 3925019

[51] Int. Cl.$^5$ .............................................. B21B 31/32
[52] U.S. Cl. ................... 29/116.2; 29/113.1; 29/113.2
[58] Field of Search ................. 29/113.2, 113.1, 116.2, 29/129

[56] References Cited

U.S. PATENT DOCUMENTS

| | | | |
|---|---|---|---|
| 3,997,953 | 12/1976 | Christ et al. ......................... | 29/116.2 |
| 4,241,482 | 12/1980 | Biondetti ............................. | 29/116.2 |
| 4,394,793 | 7/1983 | Pav et al. ............................ | 29/116.2 |
| 4,776,069 | 10/1988 | Snellman ........................... | 29/113.1 X |
| 4,815,183 | 3/1989 | Bondetti ............................. | 29/116.2 |
| 4,856,157 | 8/1989 | Küsters .............................. | 29/116.2 |
| 4,955,120 | 9/1990 | Brendel et al. ..................... | 29/113.2 |

FOREIGN PATENT DOCUMENTS 0252251 1/1988 European Pat. Off. .
2634821 12/1982 Fed. Rep. of Germany .

Primary Examiner—Timothy V. Eley
Assistant Examiner—C. Richard Martin
Attorney, Agent, or Firm—Ostrolenk, Faber, Gerb & Soffen

[57] ABSTRACT

A sag compensating roll having a stationary yoke for taking up bending forces, a hollow roll shell surrounding the yoke and hydrostatic support elements between the yoke and the shell. Each support element having a pressure shoe facing the inner surface of the shell defining a slide surface at the shell. Relief pockets recessed into the slide surface. A pressure space defined between a first piston on the yoke and the pressure shoe, and the shoe is radially movable with respect to the first piston. A pressure fluid line communicates with the pressure space and, by capillaries from the pressure space, communicates with the relief pockets. The pressure space and the relief pockets are dimensioned so that the active surface of the relief pockets is larger than the active surface of the pressure space acting on the support element. A further fluid supply line delivers temperature equalization fluid to an additional pocket located at the circumferentially downstream trailing side of the pressure shoe, at the inner surface of the roll shell. The further fluid is picked up by the inner surface of the roll shell after the shell has moved past the relief pockets. Pressure and/or quantity control between a common source of pressure fluid and each of the pressure fluid line and the additional fluid line may be provided.

21 Claims, 3 Drawing Sheets

SAG COMPENSATING ROLL FOR ROLL PRESSES

BACKGROUND OF THE INVENTION

The present invention relates to a sag compensating roll for a roll press, usable in a paper making machine, or the like. The roll includes a stationary yoke which takes up bending forces, a rotary shell that rotates around the yoke and hydrostatic support elements between the yoke and the shell. Such rolls are known from European Patent EP 0 252 251.

A gap is produced, via the hydrostatic support, between the sliding surface of an individual pressure shoe on the yoke and the inner surface of the roll shell. A certain amount of oil can emerge through that gap, which constantly forms a thin boundary layer of oil. The application force which is applied to the roll shell by the support element varies during the operation of the roll. In that case, the quantity of oil fed to the boundary oil layer also changes. Due to the shear forces in the boundary oil layer between the sliding surface of the pressure shoe and the inner surface of the roll shell, friction is produced upon rotation of the roll shell, which friction heats the oil of the boundary oil layer. Since, as mentioned above, the quantity of oil emerging through the gap varies upon differences in the application force, the temperature in this region also changes. The temperature in the boundary layer decreases with increasing force of application.

Since the application force, of course, differs over the width of the web to be treated, the temperature changes are also different. This has an unfavorable influence on the web. For instance, in the regions of increased application force, a larger quantity of oil is passed through the gap. This results in a stronger cooling action, so that the roll shell contracts more strongly at these places than at other places.

In the embodiment according to FIG. 1 of EP 0 252 251, this problem cannot occur, because in that case, the pressure space 3 is tight. As a result, different quantities of flow cannot result as a function of the linear force. However, the problem can definitely occur when the conditions are different, for instance, in the case of German Patent DE-PS 26 34 821.

SUMMARY OF THE INVENTION

It is the object of the invention to develop a sag compensating roll of the above type so that the detrimental consequences of temperature changes upon changes in the application force are avoided, as far as possible.

The invention concerns a sag compensating roll for a roll press which is used in a paper making machine, or in the like apparatus. The roll includes a stationary yoke that extends the axial length of the roll and the yoke is adapted for taking up bending forces that are applied to the roll. A hollow roll shell surrounds the yoke, extends axially of the roll around the yoke and has a radially inner surface. There is at least one and more usually a plurality of hydrostatic support elements disposed between the yoke and the roll shell. These elements are typically arrayed in a single support plane opposing the pressing force applied to the sag compensating roll.

Each support element includes a pressure shoe which is urged radially outward toward the inner surface of the support shell. That shoe has an outward surface which is a sliding surface. There are a plurality of relief pocket recesses defined in the sliding surface and each of those pocket recesses opens toward the inner surface of the shell. Pressure fluid, for example pressure oil, is delivered into the pocket recesses at sufficient pressure to exit the pocket recess toward the shell and then pass between the sliding surface and the shell.

The pressure shoe is supported and guided on a first piston usually supported to the yoke, but possibly supported to the shoe, or otherwise. There is a pressure space between the top of the piston and the bottom of the pressure shoe, and that pressure space is supplied with pressure fluid which urges the first piston toward the inner surface of the shell. Further, there is pressure fluid communication from the pressure space to the relief pocket recesses, e.g. by capillaries, and that supplies the relief pocket recesses with sufficient pressure to leave the pocket recesses and pass between the sliding surface and the inner surface of the roll shell.

The pressure space and the relief pocket recesses in the sliding surface are respectively so dimensioned that the surface area of the relief pocket recesses facing toward the inner surface of the shell is larger than the surface area of the pressure space communicating with the pressure shoe to urge the pressure shoe toward the inner surface of the shell.

According to the invention, in addition to the pressure fluid conduit, and more particularly the pressure liquid or oil conduit, to the pressure space, there is an additional conduit, i.e. a temperature equalization conduit, through which oil for temperature equalization can be fed to the inner surface of the roll shell. Due to the invention, the additional oil is distributed very uniformly and is fed to the most important areas. It can be conveyed at low pressures and with high rates of flow.

Even if the quantity of the temperature-equalization oil is kept constant, i.e. without regard to a change in the application force of the support element, that by itself already provides a considerable improvement with respect to maintaining the temperature constant, as shown by the following example:

Assume that the throughput of pressure oil (vd) drops from a given operating condition to 1/10th that rate. In this case, the temperature of the boundary layer would increase greatly, because only 1/10th of the cooling quantity of pressure oil would still be present.

However, if in addition to the quantity of pressure oil vd indicated above, an equal quantity of temperature equalization oil va is fed, this means that the entire quantity of oil effective for the cooling does not amount to merely 1/10th of the original pressure oil throughput, but to 11/20th of that throughput. This constitutes an improvement in the conditions by a factor of 5. Decisive in the case of such an unregulated addition of the temperature equalization oil of the invention is merely that this oil be actually fed directly to the pressure oil boundary layer so that temperature equalization between the thin oil layers can take place.

In a further development of the invention, the temperature equalization oil is conducted through the support element so that it does not produce any substantial application force. It thus flows through the support element substantially without pressure, or at a pressure which only insignificantly exceeds the pressure inside the roll, i.e. in the space between the roll shell and the yoke.

Particularly precise temperature equalization is achieved in that the total quantity of flow of pressure oil and temperature equalization oil at a given support element or at a group of support elements is kept constant. This can be achieved by regulating valves which are suitably controlled, or by a volumetric pump per zone, in which case the oil which is not consumed by the pressure side is fed to the temperature equalization side. This is in contrast to the above cited reference in which there is a direct connection between pump 11 and line 12.

By changing the temperature and/or quantity of the temperature equalization oil by zones or at individual support elements, an additional thermal correction across the width can be obtained.

In another preferred concept, the pressure oil is introduced into a full or annular cylinder space and produces the application force of the pressure shoe of the support element in the manner that it exerts pressure there on a piston sliding in the cylinder in the pressure shoe. It is immaterial in this connection whether the piston is attached to the transverse shaft or to the pressure shoe which presses against the roll shell.

The temperature equalization oil is fed into a smaller cross-section cylinder space which is arranged, for instance, concentrically within the larger cross-section pressure cylinder space and in which a second piston also slides. The annular pressure space is so sealed off both outside on the large piston and inside on the small piston by sealing rings that the cylinder and piston can incline with respect to each other by small amounts (angle of inclination <1°) without jamming occurring or without leaks occurring as a result. The optimal association of the large and small sealing rings is established when the two rings are in a common plane which is approximately perpendicular to the direction of pressure. The diameter of the small piston through which the temperature equalization oil flows is about 1/5 to ½ is large as that of the large piston which delimits the pressure space from the outside.

Upon rotation of the roll shell, the temperature equalization oil flowing through the small cylinder space is fed, at least predominantly, into the vicinity of the run off edge of the pressure shoe of the support element, close to the roll shell. It applies itself here by suction against the heated layers of oil emerging from the gap between the pressure shoe and the roll shell, and temperature exchange takes place between the two thin oil layers which lie directly on top of each other.

The temperature equalization oil is introduced behind the sealing web of the pressure pocket recesses on the run off, outlet or downstream side of the pressing surface of the pressure shoe, preferably via an oil distribution chamber. That chamber extends approximately in the direction of the axis of the roll and is of approximately at least the axial length occupied by the pocket recesses. The oil distribution chamber in its turn, is also delimited by a web or surrounding frame, which extends in the direction of the axis of the roll. In order that no substantial pressure can build up in the oil distribution chamber, however, this additional web is spaced, relative to the inside diameter of the roll shell, somewhat further radially inward than the webs or sliding surfaces which surround the hydrostatic pocket recesses of the pressure shoe. In the region of the oil distribution chamber, the curved contour of the pressing surface of the support shoe is stepped radially inward by a small distance. The size of the step is >0.2 mm, and preferably not larger than 5 mm.

In order for the support element to act as a temperature equalizer even if the roll is operated in different directions of rotation, it is best to provide temperature equalization oil feed outlet, i.e. an oil distribution chamber at both circumferential sides of the pressure shoe. As a result of the dynamic pressure which results on the inlet, upstream or run on side of the pressure chamber, the temperature equalization oil is urged predominantly toward the run off side or outlet side, as is desired. At high speeds, this dynamic pressure may become so great that heated boundary layer oil already flows, in addition to the temperature equalization oil, from the run on side chamber to the run off side chamber. This can be avoided by installing non-return valves in the channels to the outlets.

Instead of two concentric pistons, pistons for pressure oil and temperature equalization oil which lie alongside each other in the pressure shoe can also be used, for instance one temperature equalization oil piston between two pressure oil pistons.

Other objects and features of the invention are explained below with reference to the drawings.

DESCRIPTION OF THE PREFERRED EMBODIMENTS

Figure 1:
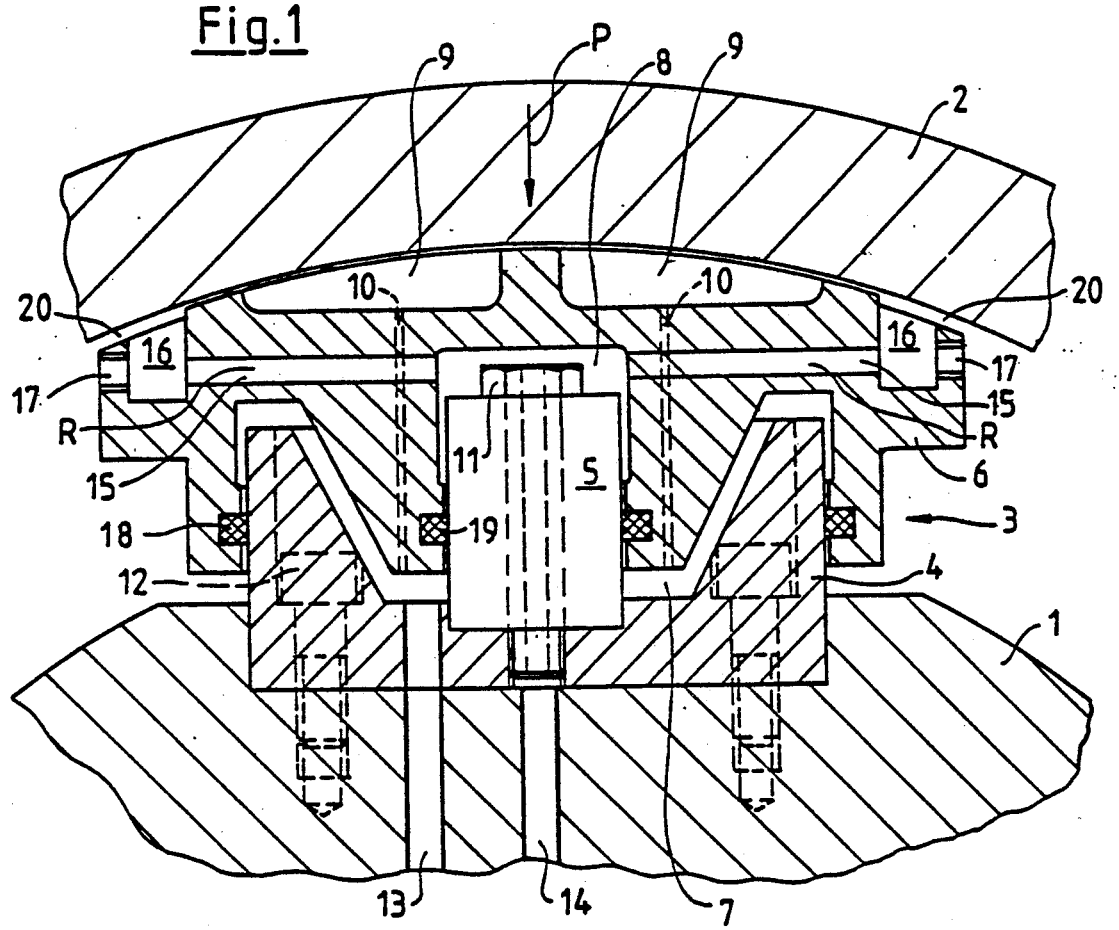
FIG. 1 shows a partial section through a sag compensating roll in a plane perpendicular to the axis.
Figure 2:
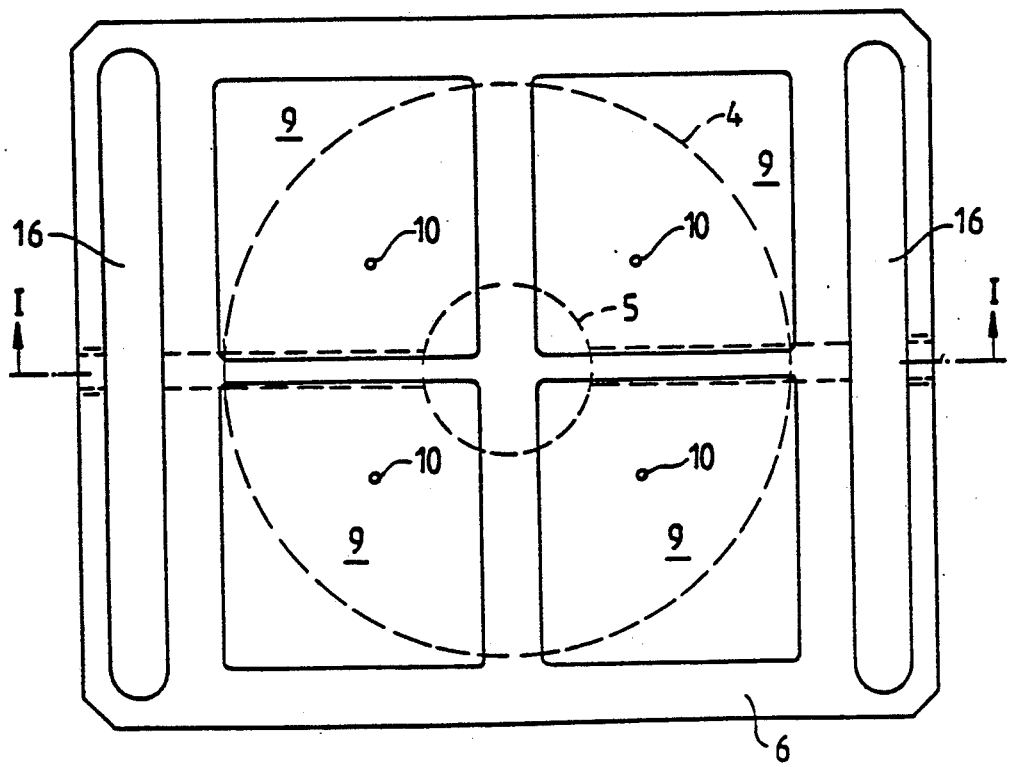
FIG. 2 is a top view of a support element with the roll shell removed.

The sag compensating roll shown in FIGS. 1 and 2 comprises a stationary yoke 1 which extends axially essentially the length of the roll, a roll shell 2 which encircles the yoke and extends essentially the length of the roll and a plurality of support elements 3 arranged along the length of the yoke and all generally in a common support plane for opposing the load to be applied to the roll shell. Only a single support element is shown in FIGS. 1 and 2, but all of those elements may be identical with respect to the invention disclosed herein.

The support element 3 comprises a radially outer piston 4, a radially inner piston 5 and a pressure shoe 6. The pressure shoe is relatively movable radially of the roll shell with respect to the pistons 4 and 5. The peripheral rim of the shoe 6 guides it on the piston 4. There is a cylindrical space 7 around the piston 5 between the outer piston 4 and the shoe 6. There is a cylindrical space 8 above the piston 5. The pressure shoe 6 has slide surfaces on its radially outward side facing the radially inner surface of the roll shell 2. Large size, quarter circle segment pockets or recesses 9 are recessed in the slide surfaces. Capillary holes 10 establish a conductive communication between the cylindrical space 7 and the pockets 9.

The active surface area of the hydrostatic pockets 9, i.e., their open top ends is, as a whole, larger than that of the cylindrical space 7. As a result, the pressure shoe 6 is lifted slightly off the roll shell 2 with respect to the piston 4, so that a small gap is produced between the pressure shoe 6 and the roll shell 2, and through that gap a certain quantity of oil flows.

The inner piston 5 is attached concentrically to the outer piston 4 by a hollow screw 11. The outer piston 4 is held fixed on the yoke 1 by threaded bolts 12. Thus, the shoe 6 shifts with reference to both pistons 4 and 5.

During operation, oil under pressure passes in conventional manner through a pressure fluid line 13 into the cylindrical space 7 in order to act, in accordance with the oil pressure, on the pressure shoe 6.

According to the invention, a second oil line 14 extends through the yoke 1. The drawing merely shows a radially extending portion of the line 14. From line 14, temperature equalization oil passes through the hollow screw 11 into the cylindrical space 8 above the piston 5, and from space 8 through opposite transverse holes 15 into respective oil distribution chambers 16 located on the circumferentially leading, or inlet, or run on side and on the trailing, or outlet, or run off side of the pressure shoe. As described above, it is the chamber then on the run off side of the pressure shoe that supplies the temperature equalization oil to the inner surface of the shell. The dynamic forces of the oil on the shell at the sliding surface helping to prevent oil from the chamber on the run on side from exiting that chamber.

If the pressure shoe 6 is made of one piece, as shown here, then closure plugs 17 are inserted in an outer boundary wall of the oil distribution chamber 16. The plugs make it possible to produce the transverse holes 15. Elastic sealing rings 18 and 19 seal off the cylindrical spaces 7 and 8 from each other and from the outside.

Numerous variants are conceivable. For instance, both pistons 4 and 5 may be attached to the pressure shoe 6 instead of being bolted to the yoke. Further, one of the pistons can instead be attached to the yoke 1 and the other piston to the pressure shoe 6. It is also conceivable to arrange the pressure piston and the temperature equalization piston alongside each other. Furthermore, the temperature equalization oil can be fed to the support element 3 via a hose line.

Non-return elements can be arranged in region "R" in the transverse holes 15, which permit flow only in the direction toward the oil distribution chambers 16. This prevents return flow of oil especially into the chamber on the run on or inlet side.

A gap 20 is present in the region of the oil distribution chamber 16 in the direction toward the inner surface of the roll shell. This gap is larger than the previously mentioned gap between the slide surface of the pressure shoe 6 and the inner surface of the roll shell.

As shown in FIG. 2, the pressure shoe 6 is of substantially rectangular shape, as viewed toward its top. However, it may also have a different shape. The oil distribution pockets 16 can then also have a corresponding shape, for instance, semi-circular.

Figure 3:
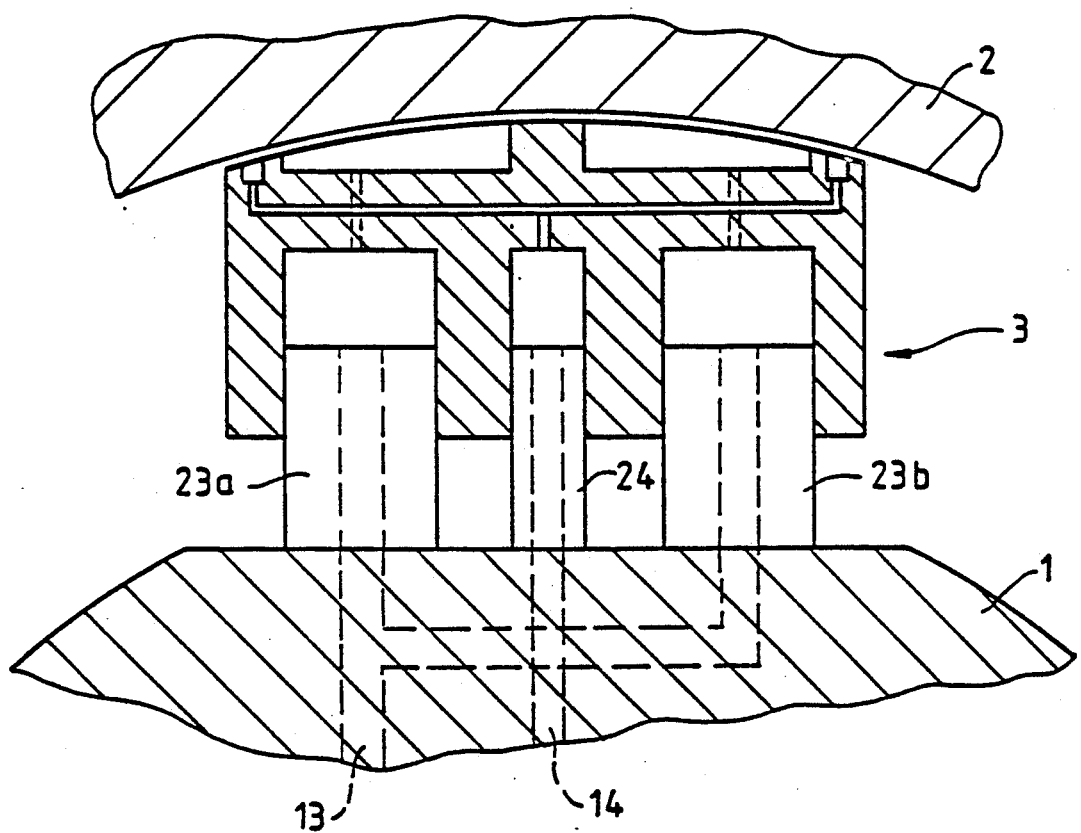
FIG. 3 is a partial section in a plane perpendicular the axis of an embodiment of a sag compensating roll, with the pistons for pressure oil and for temperature equalization oil arranged alongside each other.

In the alternate embodiment shown in FIG. 3, substantially all elements shown in the embodiment according to FIGS. 1 and 2 are again present, i.e. yoke 1, roll shell 2, support element 3, etc. In this case, however, as seen in a plane perpendicular to the axis, the pistons for pressure oil and temperature equalization oil are arranged alongside each other. The smaller cross-section piston 24 for the temperature equalization oil is arranged between two larger cross-section pistons 23a and 23b for pressure oil and the support element shoe is movable radially with respect to those pistons upon selected pressurization of the cylinder chambers above the pistons 23a and 23b. There is again a conduit 14 for temperature equalization oil and a main conduit 13 for pressure oil. This conduit 13 is branched.

Figure 4:
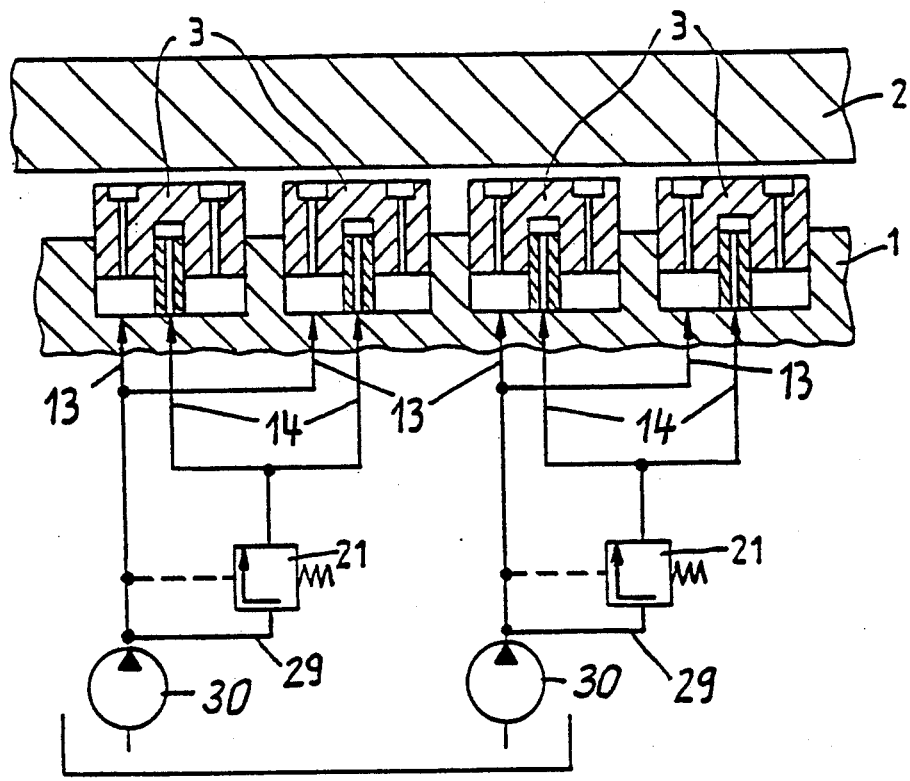
FIG. 4 shows a first alternative of a control diagram for oil supply.
Figure 5:
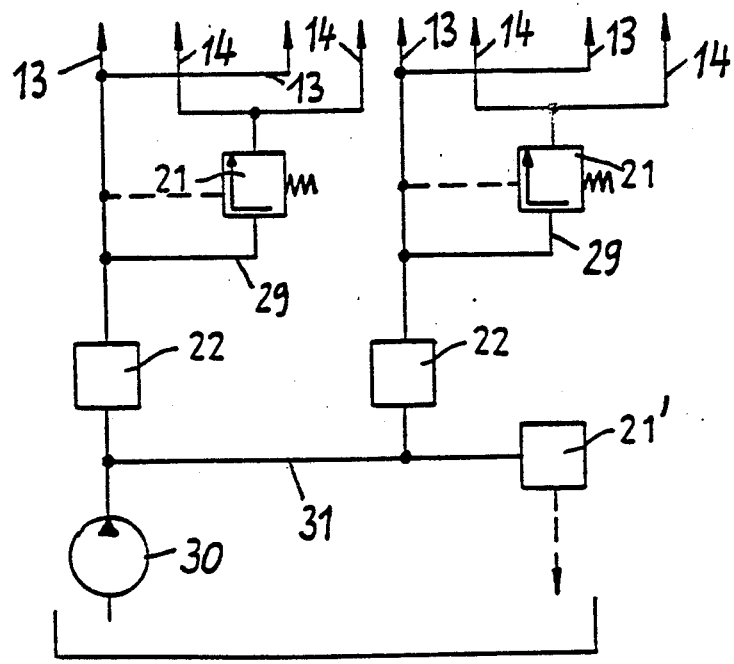
FIG. 5 shows a second alternative of a control diagram for oil supply.

In both of FIGS. 4 and 5 which show alternate arrangements, the support elements 3 are combined into groups of one or more of the support elements. In FIG. 4, each group has its own pressure oil pump 30 to the delivery side of which the pressure oil lines 13 and one branch line 29 are each connected. The branch line 29 is connected via a pressure relief valve 21 to the lines 14 for temperature equalization oil. Each of the pressure relief valves 21 maintains the pressure in the pressure oil lines 13 and thus maintains the application force at the value desired in each case and allows excess oil to flow into the lines 14.

In the modified embodiment of FIG. 5, a single pressure oil pump 30 is provided for two groups of support elements. A quantity controller 22 for each group and a joint pressure relief valve 21' are connected to the pressure line 31 of the pressure oil pump 30. At the output of each quantity controller 22, which maintains the oil throughput constant, there are again connected the pressure oil lines 13. The lines 14 for temperature equalization oil are also connected to the respective quantity controllers 22 through branch lines 29 and pressure relief valves 21. The embodiment of FIG. 5 would operate similarly to that of FIG. 4.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A sag compensating roll for a roll press, the roll comprising:

a stationary yoke extending the axial length of the roll and adapted for taking up the bending forces applied to the roll;

a roll shell surrounding the yoke, extending axially of the roll around the yoke, the roll shell being hollow and having an inner surface;

at least one hydrostatic support element disposed between the yoke and the roll shell which supports the shell and over which the shell rotates; the support element having a pressure shoe which faces radially outward toward the inner surface of the shell, and the support element pressure shoe includes a sliding surface over which the inner surface of the shell passes; the sliding surface of the pressure shoe being recessed to define relief pockets into the sliding surface, and the pockets opening toward the inner surface of the shell, such that pressure fluid in the pockets exits the pockets toward the shell and then passes between the sliding surface and the shell;

the yoke and the pressure shoe being separated, in the direction radially of the roll, to define a pressure space between the yoke and the pressure shoe, the yoke and the pressure shoe being radially relatively movable; means for delivery of pressure fluid to the pressure space, for pressurizing the pressure space for urging the pressure shoe toward the inner surface of the shell; relief pocket pressure fluid supply means communicating between the pressure space and the relief pockets for supplying some of the pressure fluid in the pressure space to the relief pockets under sufficient pressure that the pressurized fluid in the pockets leaves the pockets between the sliding surface of the pressure shoe and the inner surface of the shell;

the pressure space and the relief pockets being respectively so dimensioned that the surface area of the relief pockets facing toward the inner surface of the shell is larger than the surface area of the pressure space communicating with the pressure shoe;

a further fluid transmission line for communicating a further fluid through the support element toward the inner surface of the roll shell such that upon rotation of the roll shell with respect to the yoke and over the sliding surface, the further fluid is delivered to the inner surface of the roll shell and mixes with the pressure fluid leaving the relief pockets.

2. The sag compensating roll of claim 1, wherein the pressure shoe has a run on, leading circumferential side and an opposite, run off, trailing circumferential side with reference to the rotation of the roll shell past the sliding surface; the further line communicates to the inner surface of the roll shell at the run off, trailing side of the pressure shoe.

3. The sag compensating roll of claim 2, wherein the further fluid line is a temperature equalization line for transmitting temperature equalization oil to the inner surface of the roll shell such that the mixing of the temperature equalization oil with the pressure fluid effects a heat transfer therebetween.

4. The sag compensating roll of claim 1, wherein the relief pocket pressure fluid supply means comprise capillary conduits from the pressure space leading into the relief pockets, and the capillary conduits being thin enough that the pressure space can be pressurized while the relief pockets can be supplied with fluid under adequate pressure.

5. The sag compensating roll of claim 4, wherein the pressure shoe has a further fluid receiving pocket thereon at the sliding surface generally at the circumferential location toward the run off or trailing side of the pressure shoe, and the further pocket communicating with the further fluid transmission line serving as the communication of the further line to the inner surface of the roll shell at the run off side of the pressure shoe.

6. The sag compensating roll of claim 5, wherein the further pocket extends, in the axial direction of the support element, a distance at least as great as the axial length of that portion of the sliding surface in which the relief pockets are defined.

7. The sag compensating roll of claim 5, wherein a respective one of the further pockets for being supplied with additional fluid being defined in the sliding surface toward each circumferential side of the pressure shoe.

8. The sag compensating roll of claim 1, wherein the means for delivery of pressure fluid to the pressure space comprises a pressure fluid line.

9. The sag compensating roll of claim 8, wherein there are a plurality of the support elements each with the respective pressure shoe, pressure space, pressure fluid line and additional fluid line; the plurality of support elements being arrayed axially along the yoke and along the inner surface of the roll shell.

10. The sag compensating roll of claim 9, further comprising a common supply of pressurizing fluid leading both to the pressure fluid line and to the further fluid line; a pressure controller for controlling the relative pressures in the pressure fluid line and the further fluid line.

11. The sag compensating roll of claim 10, comprising a plurality of the pressure fluid lines each leading to a respective one of a plurality of the pressure spaces of respective support elements; a fluid quantity controller in each of the plurality of pressure fluid lines for controlling the quantity of fluid passing through the pressure fluid lines.

12. The sag compensating roll of claim 8, further comprising a common supply of pressurizing fluid leading both to the pressure fluid line and the further fluid lines; a pressure controller for controlling the relative pressures in the pressure fluid line and the further fluid line.

13. The sag compensating roll of claim 12, further comprising a quantity controller in the pressure fluid line leading to the support element for controlling the quantity of fluid supplied to the pressure space.

14. The sag compensating roll of claim 8, further comprising a quantity controller in the pressure fluid line leading to the support element for controlling the quantity of fluid supplied to the pressure space.

15. The sag compensating roll of claim 1, wherein the support element comprises a first piston on the yoke, the first piston having a radially outward surface shaped for cooperating with the pressure shoe for defining the pressure space between the first piston and the pressure shoe, and the pressure shoe being movable radially of the roll shell with respect to the first piston on the yoke.

16. The sag compensating roll of claim 15, further comprising a second piston on the yoke extending into the pressure shoe and defining inside the pressure shoe a second pressure space that is smaller in volume than the first mentioned pressure space, the pressure shoe being movable radially of the roll shell with respect to the second piston, and the second pressure space communicating with the further fluid supply line and with the inner surface of the roll shell.

17. The sag compensating roll of claim 16, wherein the pressure shoe has a further fluid receiving pocket thereon at the sliding surface generally at the circumferential location toward the run off or trailing side of the pressure shoe, and the further pocket communicating with the further fluid transmission line serving as the communication of the further line to the inner surface of the roll shell at the run off side of the pressure shoe.

18. The sag compensating roll of claim 17, wherein the first piston is of relatively larger cross-section and the second piston is of relatively smaller cross-section.

19. The sag compensating roll of claim 18, wherein the first and second pistons are arrayed alongside each other in the support element as seen in a cross-section perpendicular to the axis of the roll.

20. The sag compensating roll of claim 19, comprising two of the first pistons and one of the second pistons.

21. The sag compensating roll of claim 16, wherein the first and second pistons are concentric in the support element.

* * * * *